July 23, 1963     D. C. ANDERSON ETAL     3,098,601
TEAR TAPE FOR THERMOPLASTIC PACKAGING MATERIALS
Filed Dec. 31, 1958
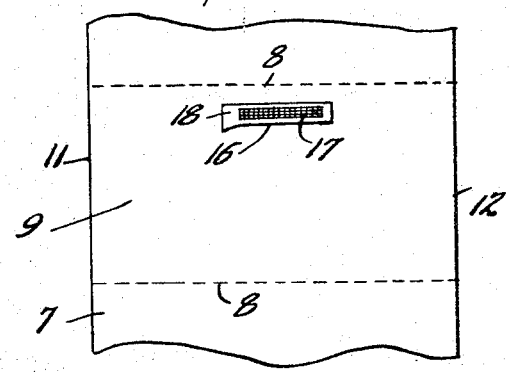
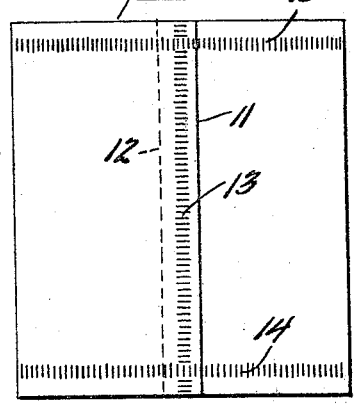
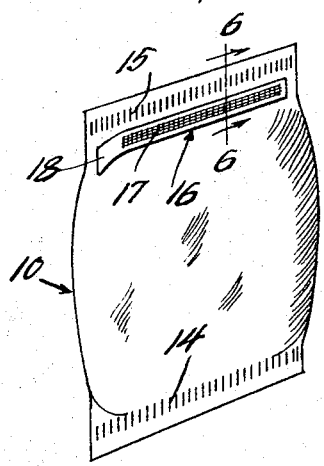
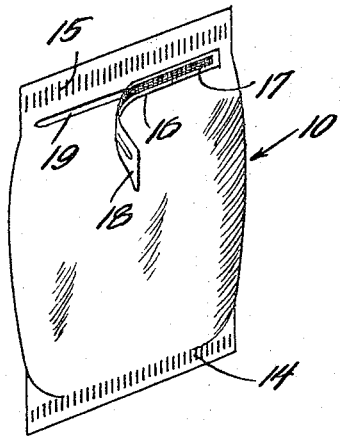
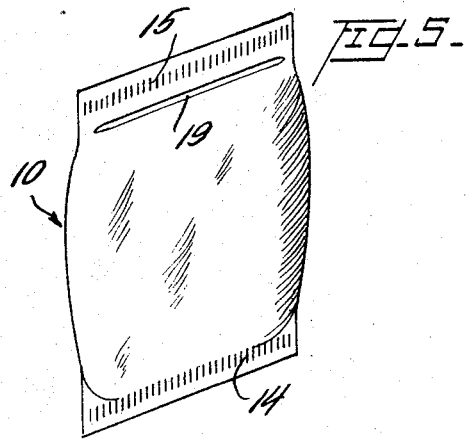
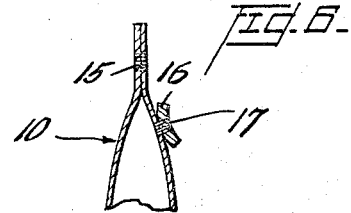
INVENTORS
Donald C. Anderson
Malcolm B. Lucas
Howard N. Watrous,
BY Watson, Cole, Grindle & Watson
ATTORNEYS

3,098,601
TEAR TAPE FOR THERMOPLASTIC PACKAGING MATERIALS

Donald C. Anderson, Malcolm B. Lucas, and Howard N. Watrous, Cincinnati, Ohio, assignors to The Procter & Gamble Company, Cincinnati, Ohio, a corporation of Ohio
Filed Dec. 31, 1958, Ser. No. 784,289
3 Claims. (Cl. 229—51)

This invention relates to tear tapes for thermoplastic packaging materials and more particularly to a tear tape which may be applied to the exterior surface without weakening the packaging material and a method of applying same. As a typical example, the tear tape of this invention can be used in conjunction with a thermoplastic bag in order that the bag can be easily opened.

In recent years there has been a trend toward the packaging of granular and powdered products as well as other solid and liquid materials in thermoplastic wrappers or bags. Such packages can be formed from a sheet of thermoplastic material by folding the sheet and applying sufficient heat and pressure to the overlapping edges of the folded sheet to form fused seams. Many thermoplastic materials, such as polyethylene for example, have been found to make a strong package which is not susceptible to tearing in the course of normal handling by reason of the stresses exerted on the package and seams. However, thermoplastic packages are difficult to open and consequently, it is desirable to incorporate a tear tape in the package in order to facilitate opening. Attempts have been made to use an internal tear tape on thermosplastic packages. However, internal tear tapes have one major disadvantage, which is that the end of the tape must protrude through the wall, usually at the seam. Such a structure presents numerous problems in maintaining a satisfactory seal at the point where the tape protrudes through the wall.

The application of an external tear tape has previously been accomplished on grainless films by placing the tape against the packaging material and applying heat and pressure to the inner surface of the packaging material to form a seam. Tear tapes applied to grainless films in this fashion require thinning of the packaging material at the seam and this causes undesirable weakening of the packaging material along the edges of the tear tape seam. Although the tear tape serves as a means for opening the package with relative ease, it is limited only to grainless films. A tear tape cannot be satisfactorily applied in this manner to the many types of grained films, such as polyethylene, which are commonly used for present day packaging.

One of the objects of the present invention is to provide an external tear tape for thermoplastic grained packaging material and a method of applying same without thinning or weakening the packaging material.

Another object of the invention is to apply a tear tape to thermoplastic packaging material without puncturing the material thereby making it possible to maintain an hermetic seal within the package formed from the material.

Still another object of the invention is to apply a tear tape of the character described, which will effectively open the package along the edges of the tear tape seam, using currently available commercial machinery for heat sealing thermoplastic materials.

Briefly stated, in accordance with one aspect of the invention, a heat-sealable thermoplastic tear tape is fused to the surface of a web of heat-sealable thermoplastic packaging material so that the long dimension of the tear tape is substantially at right angles to the long dimension of the packaging material. The thickness of the fused, heat-sealed area is at least as thick as the sum of the thicknesses of the material and tear tape. In applying a tear tape in this fashion, the strength of the packaging material adjacent the heat-sealed area is substantially unchanged but the tear tape nevertheless functions to open a package formed from the packaging material by tearing the packaging material along the edges of the heat-sealed area.

To promote an understanding of the invention, the same is described herein with some particularity and with reference to the embodiment thereof illustrated in the accompanying drawing. It will nevertheless be appreciated that no limitation on the scope of the invention is thereby intended. In the drawing:

FIGURE 1 shows a plan view of a fragment of a continuous strip of heat-sealable material from which a package can be formed and to which the tear tape has been applied, FIGURE 2 is an elevation view of one side of a typical bag to which the tear tape can be applied before the bag is formed, FIGURE 3 is a perspective view of the bag with the tear tape applied, FIGURE 4 is a perspective view of the bag with the tear tape partially removed, FIGURE 5 is a perspective view of the bag with the tear tape completely removed, and FIGURE 6 is a cross-section taken along the lines 6—6 of FIGURE 3.

The invention will be described hereinafter as applied to a bag formed from thermoplastic material, but it will be understood by those skilled in the art that the tear tape of the invention can be applied to a wrapper for any object, regardless of size or shape. FIGURE 1 illustrates, on a reduced scale, a continuous strip 7 of thermoplastic material from which a bag can be fabricated. The strip 7 is preferably supplied in a continuous web from a roll. The strip can be formed of any grained thermoplastic material such as polyethylene, for example, but other types of grained thermoplastic materials are well suited for use in the practice of the invention.

Polyethylene and similar grained heat-sealable materials are formed in thin, continuous sheets or webs by an extrusion process. The combined effects of the extrusion process plus the tensile load on the web when being drawn from the extrusion die and rolled up tend to orient the grain of the polyethylene in the direction of extrusion which is known in the art as the "machine direction." In the drawing, the strip 7 would have its grain oriented substantially perpendicular to the dotted lines 8; or, in other words, the machine direction of the grain could be stated as being vertical when the drawing is viewed in its normal position.

The bag shown in FIGURE 2 can be formed by cutting the strip 7 along the dotted lines 8 to form a blank 9 for making a bag 10. The edges 11 and 12 of the blank 9 are overlapped as shown in FIGURE 2 and a vertical seam 13 is made by the application of heat and pressure as is well known. The vertical seam 13 forms the blank into a hollow tube-like member which can be closed at the bottom by a horizontal bottom seam 14, formed by the application of heat and pressure. The bag can be filled with product after the formation of the bottom seam 14 and then closed by heat sealing the top seam 15. The formation of the bag in this manner is, of course, well known to those skilled in the art and is described and illustrated here merely to indicate one type of thermoplastic bag to which the invention can be applied.

In accordance with the present invention, a tear tape 16, as shown in FIGURE 1, is applied to the continuous strip of thermoplastic material 7 at spaced intervals prior to forming the bag. The tear tape 16 is fused to the continuous strip 7 along the seam 17 and is so positioned on the continuous strip 7 as to lie in its correct location after the blank is cut, folded and seamed to form the finished bag. One of the critical aspects of the invention is the position of the tear tape 16 with respect to the machine direction of the grain in the strip 7. As previously indicated, the machine direction of the grain in FIGURE 1 is substantially perpendicular to the dotted lines 8. In order to obtain proper tearing when opening the bag, it is important that the tear tape 16 be fused to the strip 7 so that its long dimension is substantially perpendicular to the machine direction of the grain in the strip 7. This is the relative position shown in FIGURE 1. If the tear tape 16 is oriented in any other way, it will, when pulled, frequently cause tearing of the bag material 7 in some direction other than along the edges of the seam 17 thus making it very difficult to empty the bag without spilling a portion of its contents.

The tear tape 16 is preferably wider than the seam 17 in order to assure that the bag material, rather than the tear tape, will be severed when the bag is opened. For convenience, the tear tape 16 is extended beyond one end of the seam 17 in order to provide a tab 18 which allows a user to grasp the tape readily. It has been discovered that the tape 16 should ordinarily be thicker than the bag material in order to prevent breakage of the tape while opening the bag, and to avoid undue stretching of the tape when pulled. It has been discovered that while the grain orientation in the bag material 7 is critical, the grain orientation in the tear tape 16 is not significant. Conveniently, a tear tape which is at least twice the thickness of the bag material is preferred. For example, successful results have been obtained by using a polyethylene bag material having a thickness of .0015 inch with a polyethylene tear tape having a thickness of .004 inch. This illustration is given merely by way of example and is not to be construed as a necessary limitation. The use of a tape of greater thickness than the bag material insures that the bag will be severed along the edges of the seam 17 when the tape is pulled and prevents the tape from being severed from the bag which will, of course, defeat the whole purpose of applying a tear tape.

FIGURES 3, 4 and 5 show a bag having the tear tape of the present invention in successive stages of removal. FIGURE 3 shows the filled bag with the tear tape 16 in place. The bag can be opened by grasping and pulling the tab 18. This will sever the bag along both edges of the seam 17 and leave a thin narrow opening 19 as indicated in FIGURE 4. FIGURE 5 illustrates the condition of the bag after the tear tape is removed and shows the opening 19 which exposes the contents of the bag 10, permitting discharge of the contents.

FIGURE 6 shows in cross-section the upper portion of a bag with the tear tape in place, the thickness of the materials being greatly exaggerated for purposes of illustration. The tear tape 16 is attached to the outer surface of the bag 10 by the seam 17, which is distinctively hatched. The tape 16 can be fused to the bag material by any of three current commercial methods which are the revolving hot wheel method, the hot jaw method, and the thermal impulse method. The joint may be effected by applying heat either to the bag material or the tape.

In the use of polyethylene bag and tape materials, it has been found that joining the tape can be accomplished without thinning or weakening either the bag or tape materials so that the final thickness of the combined bag and tape is equal to or greater than the combined original thickness of the tape and bag materials. This is done by holding the tape against the bag material without applying any lateral tension in the area to be joined by the seam 17. The tear tape and bag material are held together in such a manner that the area which is to form seam 17 is completely enclosed so that no compressive forces can deform the seam area. Heat is then applied to bring the bag material and the tape to the melting point at the seam area 17. The bag and tape are thus allowed to fuse together and solidify without reduction in thickness of the bag material. If the confining pressure for holding the tape against the bag material is very slight, then the molten seam area will tend to pull together or shrivel. This is due to a release of the internal stresses in the tape and bag materials. This phenomenon will form a seam which is actually thicker than the original combined thickness of the tape and bag materials. On the other hand, if the confining pressures are sufficient to prevent the molten seam area from pulling together or shriveling, then the seam area will be substantially the same thickness as the original combined thickness of the tape and bag materials. Thus a seam 17 can be formed which is equal to or greater in thickness than the combined original thickness of the bag and tape materials and the strength of the thermoplastic material along the heat-sealed area is substantially unchanged.

Although this method of applying a tear tape does not thin or weaken the bag material, the bag is nevertheless easily opened. This is possible because both edges of the seam 17 act as concentrators of shear stress when a tensile load is applied to the tear tape. Since the tape is thicker than the bag material, the shear stress severs the bag along both edges of the seam 17.

While the invention is preferably practiced by applying a polyethylene tear tape to polyethylene bag material, it is to be understood that the invention is not limited to this material, but may be used in applying a tear tape of any heat-sealable composition to any thermoplastic and heat-sealable packaging material, so long as the critical requirements regarding orientation of the bag material with respect to tear tape placement are observed.

This is a continuation-in-part of applicants' copending application Serial Number 642,788, filed on February 27, 1957, now abandoned.

A particular embodiment of the invention has been illustrated and described, but it will be obvious to those skilled in the art that various changes and modifications can be made without departing from the invention, and that it is intended to cover in the appended claims all such changes and modifications as fall within the true spirit and scope of the invention.

What is claimed as new is:

1. A package made from a grained, heat-sealable thermoplastic material having a tear tape fused thereto by means of a seam, said tear tape being substantially perpendicular to the grain in said thermoplastic material, said tear tape being thicker than said thermoplastic material, said seam being at least as thick as the combined thickness of the thermoplastic material and tear tape, the strength of the thermoplastic material being substantially unchanged along the heat-sealed area.

2. A grained heat-sealable thermoplastic package, a tear tape sealed to the outer surface of the package by means of a relatively narrow seam, said tear tape being positioned so that it is substantially perpendicular to the machine direction of the grain in the package material, said tear tape being substantially thicker than the package material, said tear tape having a projecting tab at one end thereof which is not sealed to the package, said narrow seam being at least as thick as the package material and tear tape combined, whereby the strength of the package material is substantially unchanged along the heat-sealed area.

3. A heat-sealable package made from a grained, thermoplastic material and having a heat-sealable thermoplastic tear tape fused to a narrow area on the outer surface of the package so that the long dimension of the tear tape is substantially perpendicular to the machine direction of the grain in the package material, said tear tape being thicker than said thermoplastic material, said heat-sealed area having a thickness not less than the sum of the thicknesses of the package and tear tape materials, the strength of the package material along the heat-sealed area being substantially equivalent to the strength of the package material in other areas, said tear tape being capable of tearing open said package by pulling on the tear tape whereby the package material is severed along the edges of the heat-sealed area.

References Cited in the file of this patent

UNITED STATES PATENTS

| | | |
|---|---|---|
| 2,105,367 | Parsons | Jan. 11, 1938 |
| 2,554,160 | Von Gunten | May 22, 1951 |